United States Patent
Fujihara et al.

(10) Patent No.: US 7,713,318 B2
(45) Date of Patent: May 11, 2010

(54) METHOD OF OPERATING A HYDROGEN GENERATOR AND METHOD OF OPERATING A FUEL CELL SYSTEM USING A HYDROGEN GENERATOR

(75) Inventors: Seiji Fujihara, Osaka (JP); Yukimune Kani, Osaka (JP); Kunihiro Ukai, Osaka (JP); Kiyoshi Taguchi, Osaka (JP); Hidenobu Wakita, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/348,831

(22) Filed: Jan. 5, 2009

(65) Prior Publication Data

US 2009/0123798 A1 May 14, 2009

Related U.S. Application Data

(62) Division of application No. 11/020,678, filed on Dec. 27, 2004.

(30) Foreign Application Priority Data

Dec. 26, 2003 (JP) .............................. 2003-435403

(51) Int. Cl.
*H01M 8/04* (2006.01)
*C01B 3/12* (2006.01)

(52) U.S. Cl. .................... 48/197 FM; 429/17; 423/655

(58) Field of Classification Search .............. 429/22–25
See application file for complete search history.

(56) References Cited

U.S. PATENT DOCUMENTS

2003/0035983 A1* 2/2003 Ukai et al. .................... 429/17
2003/0093950 A1 5/2003 Goebel

FOREIGN PATENT DOCUMENTS

| JP | 2002-003205 | 1/2002 |
| JP | 2002-093447 | 3/2002 |
| JP | 2003-313007 | 11/2003 |

OTHER PUBLICATIONS

International Search Report dated Sep. 4, 2007.

* cited by examiner

*Primary Examiner*—Jennifer K Michener
*Assistant Examiner*—Imran Akram
(74) *Attorney, Agent, or Firm*—Dickinson Wright PLLC

(57) ABSTRACT

The hydrogen generator includes: a reformer 101 having a reforming catalyst configured to cause a source material and water to react with each other to generate a hydrogen-rich reformed gas; a reformer heater 104 configured to heat the reformer; a carbon monoxide reducing portion 111,121 having a carbon monoxide reducing catalyst configured to reduce carbon monoxide contained in the reformed gas; a carbon monoxide reduction heater 112,123 configured to heat at least one of the carbon monoxide reducing portion, the carbon monoxide reducing catalyst and the reformed gas passing through the carbon monoxide reducing portion; and a controller 200 capable of control such that the carbon monoxide reduction heater is caused to operate in a stop operation period.

9 Claims, 9 Drawing Sheets

METHOD OF OPERATING A HYDROGEN GENERATOR AND METHOD OF OPERATING A FUEL CELL SYSTEM USING A HYDROGEN GENERATOR

This is a divisional application of application Ser. No. 11/020,678 filed Dec. 27, 2004, which claims priority based on JP 2003-435-403 filed Dec. 26, 2003, the entire contents of each of which are incorporated herein by reference.

BACKGROUND OF THE INVENTION

1. Field of the Invention

The present invention relates to a hydrogen generator configured to generate hydrogen to be supplied to fuel cells, as well as a fuel cell system using the hydrogen generator. More specifically, the invention relates to a hydrogen generator configured to heat a carbon monoxide reducing portion during a stop operation period so as to inhibit steam from condensing within the carbon monoxide reducing portion, as well as a fuel cell system using the hydrogen generator.

2. Description of the Related Art

Attention is being focused on the fuel cell cogeneration system which offers high power generating efficiency and high overall efficiency as a distributed electric power generator capable of effective energy utilization.

Many of fuel cells, including for example the phosphoric acid fuel cell having been put to practice and the polymer electrolyte fuel cell (hereinafter will be abbreviated as "PEFC") under development, generate electric power using hydrogen as fuel. However, the infrastructure for hydrogen supply has not been established yet and, hence, it is required that hydrogen be generated at the site where a fuel cell system is installed.

Seam reforming is a kind of hydrogen generation methods. The steam reforming method is adapted to generate hydrogen by a process including: mixing water vapor with a hydrocarbon material such as natural gas, LPG, gasoline, naphtha, or kerosene, or an alcohol material such as methanol; and allowing a steam reforming reaction of the resulting mixture to occur in a reformer provided with a reforming catalyst.

The steam reforming reaction produces carbon monoxide (hereinafter will be referred to as CO) as a by-product and the resulting reformed gas contains about 10% to about 15% of CO. Because CO contained in the reformed gas poisons an electrocatalyst of a PEFC thereby to lower the power generating performance of the PEFC, a CO reducing portion need be provided to lower the CO concentration of the reformed gas to 100 ppm or less, preferably 10 ppm or less at the exit of the hydrogen generator.

Usually, the CO reducing portion of the hydrogen generator reduces the CO concentration of the reformed gas to 10 ppm or less by a shifter and a CO removing portion coupled to each other, the shifter having a shift reaction catalyst configured to cause a water gas shift reaction to proceed in which CO and steam react with each other to produce hydrogen and carbon dioxide, the CO removing portion having at least one of a selective oxidization catalyst configured to cause a selective oxidization reaction between oxygen contained in supplied air and CO, or a methanation catalyst configured to methanize CO for CO reduction.

Meanwhile, the PEFC is required to start and stop according to electric power requirement for its energy utilization efficiency to be improved. The hydrogen generator is also required to start and stop accordingly.

In view of the safety of operation and the durability of the reforming catalyst, a method has been proposed of purging combustible gases remaining within the hydrogen generator using the steam in the stop operation period of the hydrogen generator (see Japanese Patent Laid-Open Publication No. 2002-93447 for example.)

Since the temperatures of respective portions of the hydrogen generator are relatively high when stopping the hydrogen generator to stop the PEFC in operation, condensation of steam into liquid will not occur within the hydrogen generator if purging with steam is followed by purging and discharging of steam out of the hydrogen generator with air or material gas.

When starting the hydrogen generator, on the other hand, the temperatures of respective of the shifter and the CO removing portion are raised by a process including: supplying the reformer with a source material and water from a material supply portion and a water supply portion, respectively; heating the reformer with a reformer heater to allow the steam reforming reaction to proceed; and passing reformed gas resulting from the steam reforming reaction through the shifter and the CO removing portion thereby to transfer heat from the reformed gas to the shifter and the CO removing portion.

For this reason, it takes a relatively long time for the temperatures of the shifter and CO removing portion to rise sufficiently. In one example it took 30 to 40 minutes for the temperatures of the shifter and CO removing portion to rise to higher than 100° C. according to actual temperature measurement, though depending on the size and structure of the hydrogen generator and like factors.

Thus, for example, in cases where the hydrogen generator has to be stopped during the start operation period of the hydrogen generator, particularly the CO reducing portion, which is located on the downstream side in the hydrogen generator, is often at a temperature close to a room temperature. If purging with steam is conducted at that time, steam condenses to liquid water within the CO reducing portion and, in some cases, such condensation occurs on the CO reducing catalyst placed within the CO reducing portion undesirably. Such condensation of steam to water on the CO reducing catalyst causes the characteristics of the CO reducing catalyst to deteriorate problematically.

There exists a hydrogen generator using heating means such as a heater. However, the heating means is used to heat the catalyst only in the start operation period, not in the stop operation period. Therefore, in cases where the operation of the hydrogen generator is stopped immediately after having been started, the temperature of the CO reducing portion is not sufficiently raised and, hence, it is possible that the water contained in the purge gas condenses and deteriorates the catalyst.

In view of the problems essential to the prior art described above, the present invention intends to provide a hydrogen generator which is configured to inhibit condensation of water within the CO reducing portion during the stop operation period, as well as a fuel cell system using the same.

SUMMARY OF THE INVENTION

According to a first aspect of the present invention, there is provided a hydrogen generator comprising: a reformer having a reforming catalyst configured to cause a source material and water to react with each other to generate a hydrogen-rich reformed gas; a reformer heater configured to heat the reformer; a carbon monoxide reducing portion having a carbon monoxide reducing catalyst configured to reduce carbon monoxide contained in the reformed gas; a carbon monoxide reduction heater configured to heat at least one of the carbon monoxide reducing portion, the carbon monoxide reducing catalyst and the reformed gas passing through the carbon monoxide reducing portion; and a controller configured to perform control such that the carbon monoxide reduction heater is caused to operate in a stop operation period in a manner that a temperature of the carbon monoxide reducing portion is kept higher than a first predetermined temperature which fails to allow steam present within the carbon monoxide reducing portion to condense.

In an embodiment of the hydrogen generator according to the first aspect of the present invention, the carbon monoxide reducing portion may comprise at least one of a shifter and a carbon monoxide removing portion; the carbon monoxide reduction heater may comprise at least one of a shifter heater and a carbon monoxide removing portion heater; the shifter may have a carbon monoxide reducing catalyst comprising a shift reaction catalyst; and the carbon monoxide removing portion may have a carbon monoxide reducing catalyst comprising at least one of a selective oxidization catalyst and a methanation catalyst.

Another embodiment of the hydrogen generator according to the first aspect of the present invention may further comprise a carbon monoxide reducing portion temperature sensor configured to detect a temperature of the carbon monoxide reducing portion, wherein the controller is configured to perform control such that the carbon monoxide reduction heater is caused to operate in the stop operation period for at least a time period during which the temperature of the carbon monoxide reducing portion is not higher than the first predetermined temperature.

In another embodiment of the hydrogen generator according to the first aspect of the present invention, the controller may be configured to perform control such that the carbon monoxide reduction heater is caused to operate in response to a stop instruction to initiate a stop operation in the stop operation period.

In this embodiment, the controller may be configured to perform control such that the carbon monoxide reduction heater may be caused to stop operating after lapse of a predetermined time period from issuance of the stop instruction in the stop operation period.

Another embodiment of the hydrogen generator according to the first aspect of the present invention may further comprise a reformer temperature sensor configured to detect a temperature of the reformer, wherein the controller may be configured to perform a control process in the stop operation period, the control process including: stopping supply of the source material and supply of water; causing the carbon monoxide reduction heater to operate; supplying the source material to purge an interior of said hydrogen generator when the temperature detected by the reformer temperature sensor becomes a temperature which fails to allow carbon to be deposited on the reforming catalyst; and stopping the supply of the source material and the operation of said carbon monoxide reduction heater.

Another embodiment of the hydrogen generator according to the first aspect of the present invention may further comprise a first purge gas supply portion configured to supply a first purge gas; a second purge gas supply portion configured to supply a second purge gas; and a reformer temperature sensor configured to detect a temperature of the reformer, wherein the controller may be configured to perform control in the stop operation period such that: when the temperature detected by the reformer temperature sensor is lower than a second predetermined temperature, the second purge gas supply portion is caused to operate until the hydrogen generator becomes fully filled with the second purge gas; and when the temperature detected by the reformer temperature sensor is not lower than the second predetermined temperature, the first purge gas supply portion is caused to operate until the temperature detected by said reformer temperature sensor becomes lower than the second predetermined temperature and then the second purge gas supply portion is caused to operate until the hydrogen generator becomes fully filled with the second purge gas.

In this embodiment, it is possible that: the first purge gas is steam; the second purge gas is air; and the second predetermined temperature is a temperature which fails to allow the reforming catalyst to be oxidized.

Alternatively, it is possible that: the first purge gas is steam; the second purge gas is the source material; and the second predetermined temperature is a temperature which fails to allow carbon to be deposited on the reforming catalyst.

Yet alternatively, it is possible that: the first purge gas is one of a combustion exhaust gas and an inert gas.

According to a second aspect of the present invention, there is provided a fuel cell system comprising: a hydrogen generator as recited above; and a fuel cell configured to generate electric power using hydrogen generated by the hydrogen generator.

The foregoing and other objects, features and attendant advantages of the present invention will become more apparent from the reading of the following detailed description of the invention in conjunction with the accompanying drawings.

DETAILED DESCRIPTION OF THE PREFERRED EMBODIMENTS

Hereinafter, embodiments of the present invention will now be described in detail with reference to the accompanying drawings.

Embodiment 1

Figure 1:
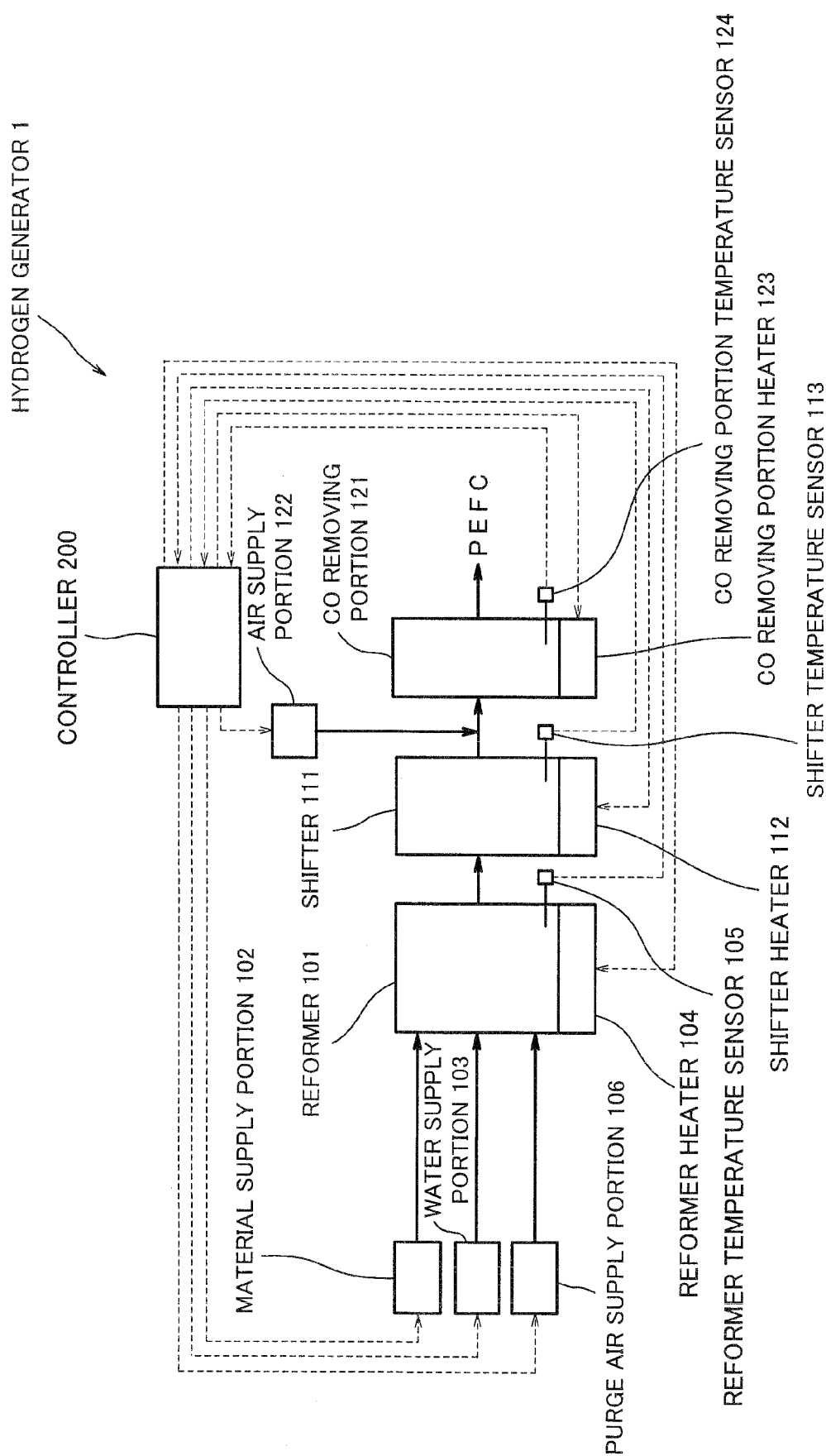
FIG. 1 is a block diagram illustrating the configuration of a hydrogen generator according to embodiment 1 of the present invention.

Referring first to FIG. 1 illustrating the configuration of a hydrogen generator 1 according to embodiment 1, the hydrogen generator 1 includes a reformer 101 having a reforming catalyst configured to cause a reaction between water and a hydrocarbon material supplied as a source material to occur to generate a hydrogen-rich gas, a material supply portion 102 configured to supply the source material to the reformer 101, and a water supply portion 103 configured to supply water to the reformer 101.

The reformer 101 is equipped with a reformer heater 104 configured to heat the reformer 101 and a reformer temperature sensor 105 configured to detect the temperature of the reformer 101. The source material and water supplied to the reformer 101 are heated thereat by the reformer heater 104, to generate a reformed gas. The heating calories generated in the reformer heater 104 is determined from the temperature of the reforming catalyst detected by the reformer temperature sensor 105.

The reformer temperature sensor 105 may be configured to detect the temperature of the reformed gas having passed through the reforming catalyst. The source material to be supplied from the material supply portion 102 simply contains a compound comprising at least carbon and hydrogen. Examples of such source materials include hydrocarbon materials such as natural gas, LPG, naphtha, gasoline and kerosene, and alcohol materials such as methanol.

Downstream of the reformer 101 in the material feed direction, there is disposed a shifter 111 having a shift reaction catalyst (not shown) configured to reduce CO contained in the reformed gas fed from the reformer 101 by causing a water gas shift reaction to occur. The shifter 111 is equipped with a shifter heater 112 configured to heat the shifter 111, a shift reaction catalyst and the reformed gas, and a shifter temperature sensor 113 configured to detect the temperature of the reformed gas flowing within the shifter 111. Note that: the shifter 111 is an embodiment of a carbon monoxide reducing portion defined by the present invention; the shift reaction catalyst is an embodiment of a carbon monoxide reducing catalyst defined by the present invention; the shifter heater 112 is an embodiment of a carbon monoxide reduction heater defined by the present invention; and the shifter temperature sensor 113 is an embodiment of a carbon monoxide reducing portion temperature sensor defined by the present invention.

In embodiment 1, an electric heater is used as the shifter heater 112 and fitted on the exterior of the shifter 111. The shifter heater 112 may be any heating device capable of heating the shifter 111 such as a burner or a catalytic combustor without any particular limitation to such an electric heater. The shifter temperature sensor 113 may be configured to be capable of detecting the temperature of the shift reaction catalyst.

Downstream of the shifter 111, there is disposed a CO removing portion 121 having a CO removing catalyst configured to further reduce CO contained in the reformed gas having passed through the shifter 111. The CO removing portion 121 is equipped with a CO removing portion heater 123 configured to heat at least one of the CO removing portion 121, CO removing catalyst and reformed gas, and a CO removing portion temperature sensor 124 configured to detect the temperature of the reformed gas flowing within the CO removing portion 121. An air supply portion 122 is disposed between the CO removing portion 121 and the shifter 111. The CO removing portion 121 is configured to cause a selective oxidization reaction between oxygen contained in air supplied from the air supply portion 122 and CO contained in the reformed gas thereby to reduce the CO concentration of the reformed gas. Note that: the CO removing portion 121 is an embodiment of the carbon monoxide reducing portion defined by the present invention; the CO removing catalyst is an embodiment of the carbon monoxide reducing catalyst defined by the present invention; the CO removing portion heater 123 is an embodiment of the carbon monoxide reduction heater defined by the present invention; and the CO removing portion temperature sensor 124 is an embodiment of the carbon monoxide reducing portion temperature sensor defined by the present invention.

The CO removing catalyst may be a catalyst configured to reduce CO contained in the reformed gas by causing a methanation reaction to proceed. Alternatively, the CO removing catalyst may comprise, in combination, a catalyst causing the selective oxidization reaction to proceed and a catalyst causing the methanation reaction to proceed. That is, the CO removing catalyst may comprise either or both of the selective oxidization catalyst configured to catalyze the selective oxidization reaction and the methanation catalyst configured to catalyze the methanation reaction. In embodiment 1, an electric heater is used as the CO removing portion heater 123 and is fitted on the exterior of the CO removing portion 121. The CO removing portion heater 123 may be any heating device capable of heating the CO removing portion such as a burner or a catalytic combustor without any particular limitation to such an electric heater. The CO removing portion temperature sensor 124 may be configured to be capable of detecting the temperature of the CO removing catalyst.

The hydrogen generator 1 according to embodiment 1 includes a purge air supply portion 106 located upstream of the reformer 101, the purge air supply portion 106 being configured to supply air during the stop operation period of the hydrogen generator 1.

In FIG. 1, solid lines represent the feeding-fed relations among the components of the hydrogen generator 1 as to the source material, water, air and hydrogen-rich gas, and solid arrows indicate the directions in which the source material, water, air and hydrogen-rich gas are fed.

The hydrogen generator 1 further includes a controller 200 configured to control the heating calories generated in each of the shifter heater 112 and the CO removing portion heater 123 and the operation of each component such as the stop operation of the material supply portion 102, during the stop operation period of the hydrogen generator 1. The controller 200 is communicatively connected to the material supply portion 102, water supply portion 103, purge air supply portion 106, reformer heater 104, shifter heater 112, CO removing portion heater 123 and air supply portion 122 so as to control these components. Further, the controller 200 is communicatively connected to the reformer temperature sensor 105, shifter temperature sensor 113 and CO removing portion temperature sensor 124 so as to receive inputs of signals therefrom. In FIG. 1, the dotted lines represent the signal transmitting-receiving connections of the controller 200 with respective of other components and the dotted arrows indicate the signal transmitting directions.

While the carbon monoxide reducing portion according to the present invention comprises the shifter 111 and the CO removing portion 121 in embodiment 1, it may comprise only one of the shifter 111 and the CO removing portion 121 selected in accordance with a predetermined concentration, if the target CO concentration is equal to or lower than a predetermined concentration.

Figure 8:
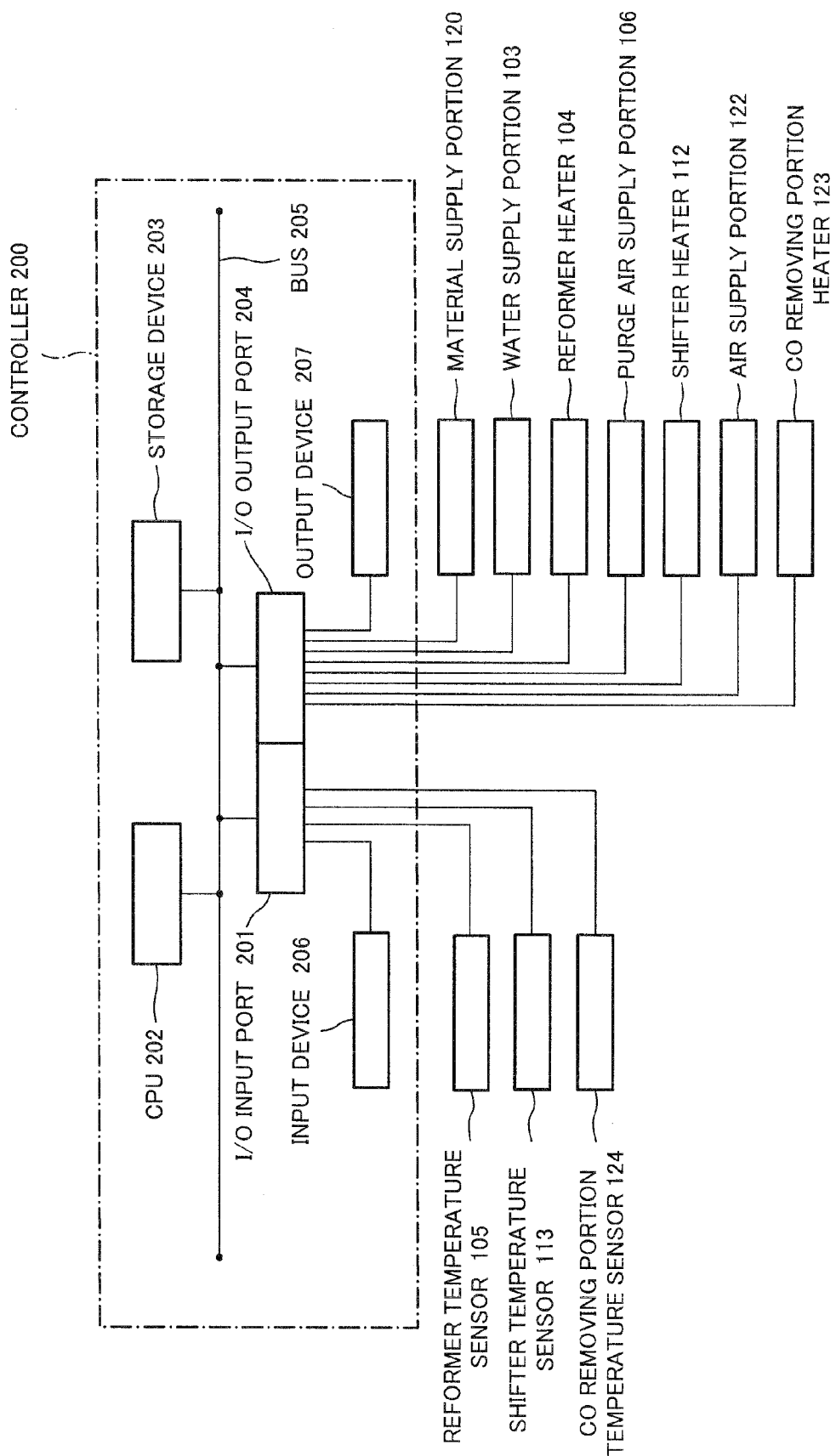
FIG. 8 is a wiring diagram schematically illustrating the configuration of a controller 200 in embodiment 1 of the present invention.

Description will be made of the controller 200. FIG. 8 is a wiring diagram schematically illustrating the configuration of the controller 200. The controller 200 includes an I/O input port 201, CPU 202, storage device 203, I/O output port 204, bus 205, input device 206, and output device 207. The I/O input port 201, CPU 202, storage device 203, I/O output port 204 are interconnected via the bus 205. The input device 206 is connected to the I/O input port 201. The output device 207 is connected to the I/O output port 204. The I/O input port 201 is also connected to the controlled amount detecting devices, i.e., the reformer temperature sensor 105, shifter temperature sensor 113, and CO removing portion temperature sensor 124. The I/O output port 204 is also connected to the controlled components, i.e., the material supply portion 102, water supply portion 103, reformer heater 104, purge air supply portion 106, shifter heater 112, air supply portion 122, and CO removing portion heater 123.

In this embodiment, the input device 206 comprises a keyboard or the like and the output device 207 comprises a display or the like.

The operation of the controller 200 will be described with reference to FIG. 8. The input device 206 inputs set values, including the amount of hydrogen to be generated, to the CPU 202 via the I/O input port 201. The CPU 202 stores the information into the storage device 203 as necessary. Signals indicative of controlled amounts detected by the respective detecting devices are transferred to the CPU 202 via the I/O input port 201. The CPU 202 stores these detected values into the storage device 203 as necessary. A control program is pre-stored in the storage device 203. The CPU 202 calculates a target controlled value for each of the controlled components by using the detected values, control program and the like stored in the storage device 203. Further, the CPU 202 rewrites the target controlled values and the like stored in the storage device 203 as the need arises from the results of calculation. When necessary, the CPU 202 transmits a signal indicative of an amount of operation on each controlled component to the controlled component via the I/O output port 204. The target controlled values, detected values, control program and the like, which are stored in the storage device 203 are outputted to the output device 207 via the I/O output port 204 so as to be confirmed by the operator. By the operation of the controller 200 thus described, the values of controlled amounts are detected and controlled and the hydrogen generator 1 is caused to operate.

Here, the hydrogen generator 1 according to embodiment 1 supplies the hydrogen-containing reformed gas having a reduced CO concentration, to a PEFC (polymer electrolyte fuel cell: not shown) where the reformed gas reacts with an oxygen-containing oxidization gas supplied thereto to generate electric power.

The following description is directed to an example of the operation of the hydrogen generator 1, having the above-described configuration according to embodiment 1.

During the operation of the hydrogen generator 1 the material supply portion 102 and water supply portion 103 supply the source material and water, respectively, to the reforming catalyst accommodated in the reformer 101. The reformer heater 104 heats the reformer 101 so that the temperature detected by the reformer temperature sensor 105 becomes 650° C., thereby allowing a steam reforming reaction to proceed. The CO concentration of the reformed gas having passed through the reformer 101 is about 10%.

The reformed gas having passed through the reformer 101 is fed to the shifter 111 in order for the CO concentration of the reformed gas to be reduced. The shift reaction catalyst accommodated in the shifter 111 causes a water gas shift reaction to proceed, thereby reducing CO contained in the reformed gas. The CO concentration of the reformed gas having passed through the shifter 111 is about 0.3%.

To further reduce CO contained in the reformed gas, the reformed gas having passed through the shifter 111 is mixed with air supplied from the air supply portion 122 and the resulting gas mixture is fed to the CO removing portion 121. The CO concentration of the reformed gas is reduced to 100 ppm or less by a selective oxidization reaction caused by the CO removing catalyst accommodated in the CO removing portion 121. The reformed gas, the CO concentration of which has been thus reduced, is supplied to the PEFC for electric power generation.

Figure 2:
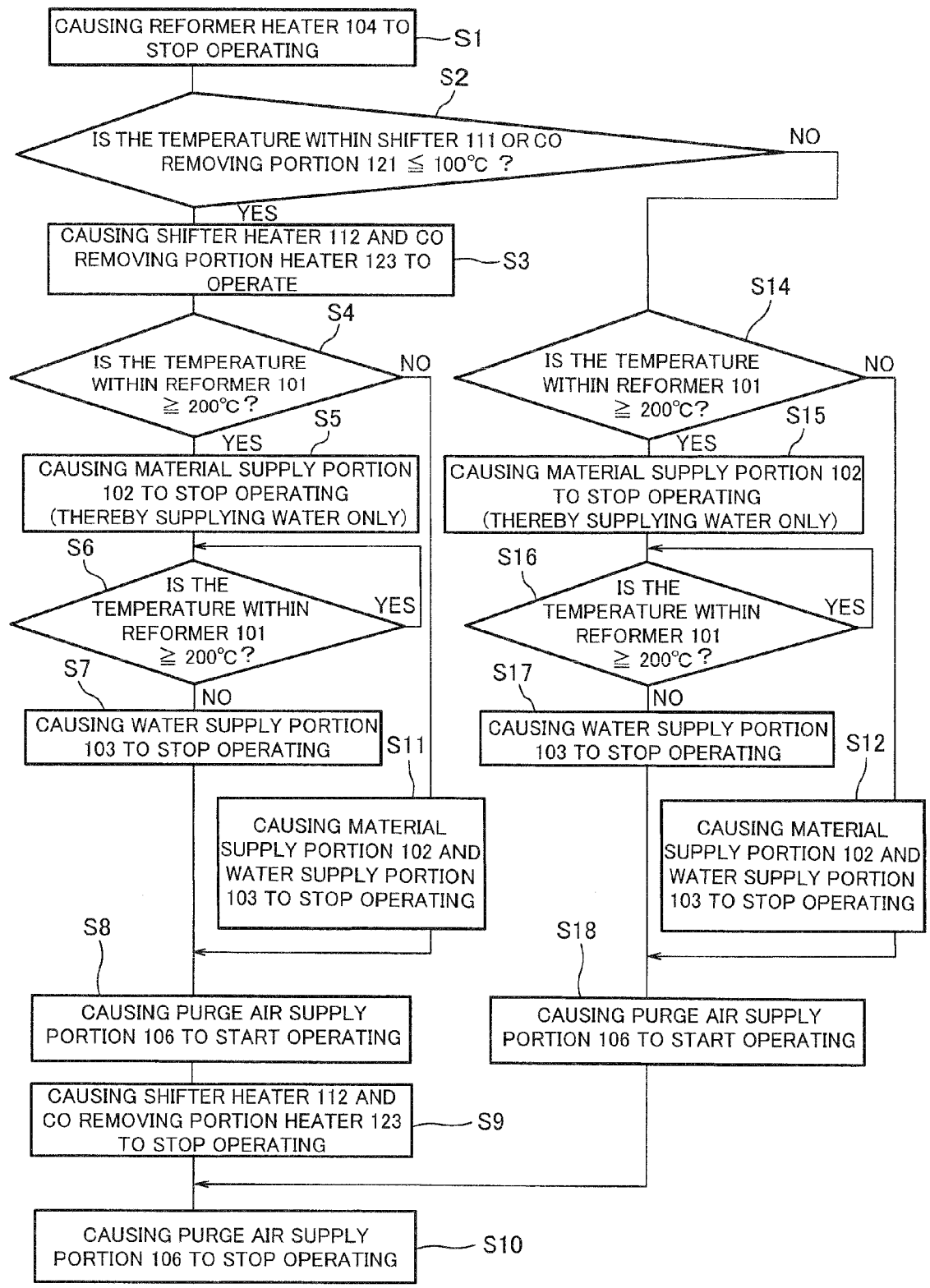
FIG. 2 is a flowchart illustrating an example of a control program executed during the stop operation period of the hydrogen generator shown in FIG. 1.

With reference to the flowchart of FIG. 2, description is made of an example of a control program executed during the stop operation period of the hydrogen generator 1 according to embodiment 1. The "stop operation", as used herein, is meant to include the operation of stopping hydrogen generation in all cases including not only the case of stop running but also the case of suspension. The "stop operation period" is meant by a time period from a stop instruction is issued until the hydrogen generator 1 stops operating, during which a series of operations are performed.

Initially, in step S1, the controller 200 causes the reformer heater 104 to stop operating.

Subsequently, in step S2, the controller 200 determines whether or not the temperature detected by the shifter temperature sensor 113 or by the CO removing portion temperature sensor 124 is not higher than 100° C., which is an example of a first predetermined temperature defined by the present invention.

Here, the first predetermined temperature is the dew point of steam within each of the shifter 111 and CO removing portion 121. In the stop operation period, the internal pressure of each of these components is higher than atmospheric pressure, and when purging with steam is conducted, the partial pressure of steam within each of those components is approximately 100% and the dew point therewithin is approximately 100° C. For this reason, the first predetermined temperature is set to 100° C. in the following description. In some cases, however, the first predetermined temperature is not necessarily 100° C. depending on the internal pressure or the partial pressure of steam. Therefore, the first predetermined temperature may be any temperature which fails to allow steam to condense within the shifter 111 or CO removing portion 121, that is, any temperature higher than the dew point, without any particular limitation to 100° C.

Subsequently, if the temperature detected by the shifter temperature sensor 113 or by the CO removing portion temperature sensor 124 is not higher than 100° C., in step S3, the controller 200 causes the shifter heater 112 and the CO removing portion heater 123 to operate to start heating the shifter 111 and CO removing portion 121. At this time, the controller 200 controls heating so that the temperature detected by each of the shifter temperature sensor 113 and the CO removing portion temperature sensor 124 is kept higher than 100° C. This heating step inhibits steam supplied thereafter from condensing on the shift reaction catalyst or the CO removing catalyst and allows steam to be discharged outside the hydrogen generator 1.

Subsequently, in step S4, the controller 200 determines whether or not the temperature detected by the reformer temperature sensor 105 is not lower than 200° C., which is an example of a second predetermined temperature defined by the present invention. This determination is conducted because if air is supplied when the temperature of the reformer 101 is not lower than 200° C., the reforming catalyst is oxidized and deteriorated by air.

If the temperature of the reformer 101 is determined to be not lower than 200° C. in step S4, the controller 200 stops the operation of the material supply portion 102 in step S5. By stopping the operation of the material supply portion 102 while keeping the water supply from the water supply portion 103, supplied water is evaporated into steam, which is an example of the first purge gas defined by the present invention, within the reformer 101. In this embodiment, the water supply portion 103 serves as the first purge gas supply portion defined by the present invention. Steam thus produced passes through the shifter 111 and the CO removing portion 121 to purge residual combustible gas mainly comprising hydrogen from the hydrogen generator 1 and then is discharged outside the hydrogen generator 1.

Subsequently, in step S6, the controller 200 causes the reformer temperature sensor 105 to continue temperature detection until the temperature detected by the reformer temperature sensor 105 becomes lower than 200° C.

Subsequently, in step S7, after the temperature within the reformer 101 has decreased to lower than 200° C., the controller 200 stops the operation of the water supply portion 103, thereby stopping the supply of steam.

In step S8, in turn, the controller 200 causes the purge air supply portion 106 to start operating and continue operating for a predetermined time period. By doing so, the supplied air purges residual steam from the interior of the hydrogen generator 1 and is then discharged outside the hydrogen generator 1. This means that this embodiment uses air as the second purge gas defined by the present invention. The purge air supply portion 106 in this embodiment serves as the second purge gas supply portion defined by the present invention. The aforementioned predetermined time period is sufficient to purge steam from the interior of the hydrogen generator 1. However, if the temperature of each of the shifter 111 and the CO removing portion 121 does not reach 100° C. at the beginning of or before the beginning of step S8, purging with air needs to be performed for the predetermined time period from the time 100° C. is reached even though the operation of purging with air in step S8 has already started. If purging with steam is conducted in a state where 100° C. is not reached yet, it is possible that steam condenses. However, by conducting purging with air for the predetermined time period from the time 100° C. is reached, condensed water can be evaporated and discharged.

Subsequently, in step S9, after the interior of the hydrogen generator 1 has been completely purged with air, the controller 200 stops the operation of each of the shifter heater 112 and the CO removing portion heater 123.

Finally, in step S10, the controller 200 causes the purge air supply portion 106 to stop supplying air. In this way, the stop operation of the hydrogen generator 1 is completed.

On the other hand, if both of the temperatures detected by respective of the shifter temperature sensor 113 and the CO removing portion temperature sensor 124 are determined to be higher than 100° C. in step S2, steam condensation does not occur even under a condition in which heating is not conducted. For this reason, the process proceeds to step S14 without causing the shifter heater 112 and CO removing portion heater 123 to operate.

In step S14, in turn, the controller 200 determines whether or not the temperature within the reformer 101 is not lower than 200° C. as in step S4.

Subsequently, in step S15, the operation of the material supply portion 102 is stopped as in step S5.

Subsequently, in step S16, temperature detection is continued until the temperature detected by the reformer temperature sensor 105 becomes lower than 200° C. as in step S6.

Subsequently, in step S17, after the temperature within the reformer 101 has decreased to lower than 200° C., the operation of the water supply portion 103 is stopped as in step S7.

Subsequently, in step S18, the operation of the purge air supply portion 106 is started and continued for the predetermined time period. By doing so, the supplied air purges residual steam from the interior of the hydrogen generator 1 completely, as in step S8.

Finally, in step S10, the supply of air from the purge air supply portion 106 is stopped.

If the temperature detected by the reformer temperature sensor 105 is determined to be lower than 200° C. in step S4 or step S14, the reforming catalyst will not be oxidized due to purging with air (second purge gas) even if the interior of the hydrogen generator 1 is not purged with steam (first purge gas). For this reason, when the temperature within the reformer 101 is lower than 200° C., the process proceeds from step S4 to step S11 in which the operation of each of the material supply portion 102 and the water supply portion 103 is stopped and then to step S8 in which air supply is conducted. From step S14, the process proceeds to step S12 in which the operation of each of the material supply portion 102 and the water supply portion 103 is stopped and then to step S18.

In this way, the temperature within each of the shifter 111 and the CO removing portion 121 can be kept higher than 100° C. by the stop operation in which the shifter heater 112 and the CO removing portion heater 123 are caused to operate. For this reason, steam used for purge does not condense within each of the shifter 111 or the CO removing portion 121. Further, since there is no possibility that steam remains and condenses within each of the shifter 111 and the CO removing portion 121, the catalytic characteristics of the catalysts used therein can be inhibited from deteriorating.

The stop operation described above may be performed not only when the hydrogen generator 1 is in an unsteady operation state like a state just after start but also when the hydrogen generator 1 is in a steady operation state.

While both of the shifter 111 and the CO removing portion 121 are heated in step S3 if the temperature within the shifter 111 or the CO removing portion 121 is determined to be not higher than 100° C. in steps S2, heating may be conducted for only one of these components, the temperature of which is not higher than 100° C.

While steps S2, S4 and S14 are each followed by one of different steps which is selected depending on the result of determination, steps S1 to S10 except steps S2, S4 and S14 may be conducted regardless of the temperatures of these components, which means that determinations in steps S2, S4 and S14 may be omitted. Since it is possible that the reforming catalyst is oxidized and deteriorated by the supplied air when the internal temperature of the reformer 101 is not lower than 200° C., it is preferable to conduct determination in step S6.

While the operations of respective of the shifter heater 112 and the CO removing portion heater 123 are stopped in step S9, they may be stopped in any step without limitation to step S9. For example, the controller 200 may perform control such that, with the temperatures within respective of the shifter 111 and the CO removing portion 121 being monitored by the shifter temperature sensor 113 and the CO removing portion temperature sensor 124, the shifter heater 112 and the CO removing portion heater 123 are caused to operate when the temperature within one of the shifter 111 and the CO removing portion 121 becomes not higher than 100° C. and stop operating when the temperature becomes higher than 100° C.

If the temperature within the shifter 111 or the CO removing portion 121 is determined to be higher than 100° C. in step S2, steps S14 to S18 are performed without the shifter heater 112 and CO removing portion heater 123 operating, it is possible that with the temperature within each of the shifter 111 and the CO removing portion 121 being monitored, the shifter heater 112 and the CO removing portion heater 123 are caused to operate when the temperature becomes not higher than 100° C.

It is possible that step S2 in which the controller 200 determines whether or not the temperature of the shifter 111 or the CO removing portion 121 is not higher than 100° C. and step S3 in which the shifter heater 112 and the CO removing portion heater 123 are caused to operate are performed just before step 8 in which the operation of the purge air supply portion 106 is started. Alternatively, steps S2 and S3 may be performed with the purge air supply portion 106 operating to purge the interior of the hydrogen generator 1 with air. In any case, the shifter heater 112 and the CO removing portion heater 123 may be caused to operate at any time as long as the temperature of each of the shifter 111 and the CO removing portion 121 can be adjusted to inhibit condensed water from remaining within each of the shifter 111 and the CO removing portion 121.

In this embodiment, the shifter temperature sensor 113 and the CO removing portion temperature sensor 124 are configured to monitor the temperatures within respective of the shifter 111 and within the CO removing portion 121. However, it is possible to determine whether or not to cause the shifter heater 112 and the CO removing portion heater 123 to operate based on physical values related to the temperature within each of the shifter 111 and the CO removing portion 121. Examples of such physical values include the temperature of the reformer 101 detected by the reformer temperature sensor 105, an elapsed time from the start of the operation of the hydrogen generator 1, the amount of water supplied to the reformer 101, and the humidity within each of the shifter 111 and the CO removing portion 121.

The hydrogen generator 1 according to this embodiment is not necessarily used in fuel supply to PEFCs and can find use in fuel supply to other types of fuel cells and applications in chemical plants or the like requiring generation of high purity hydrogen.

Embodiment 2

Figure 3:
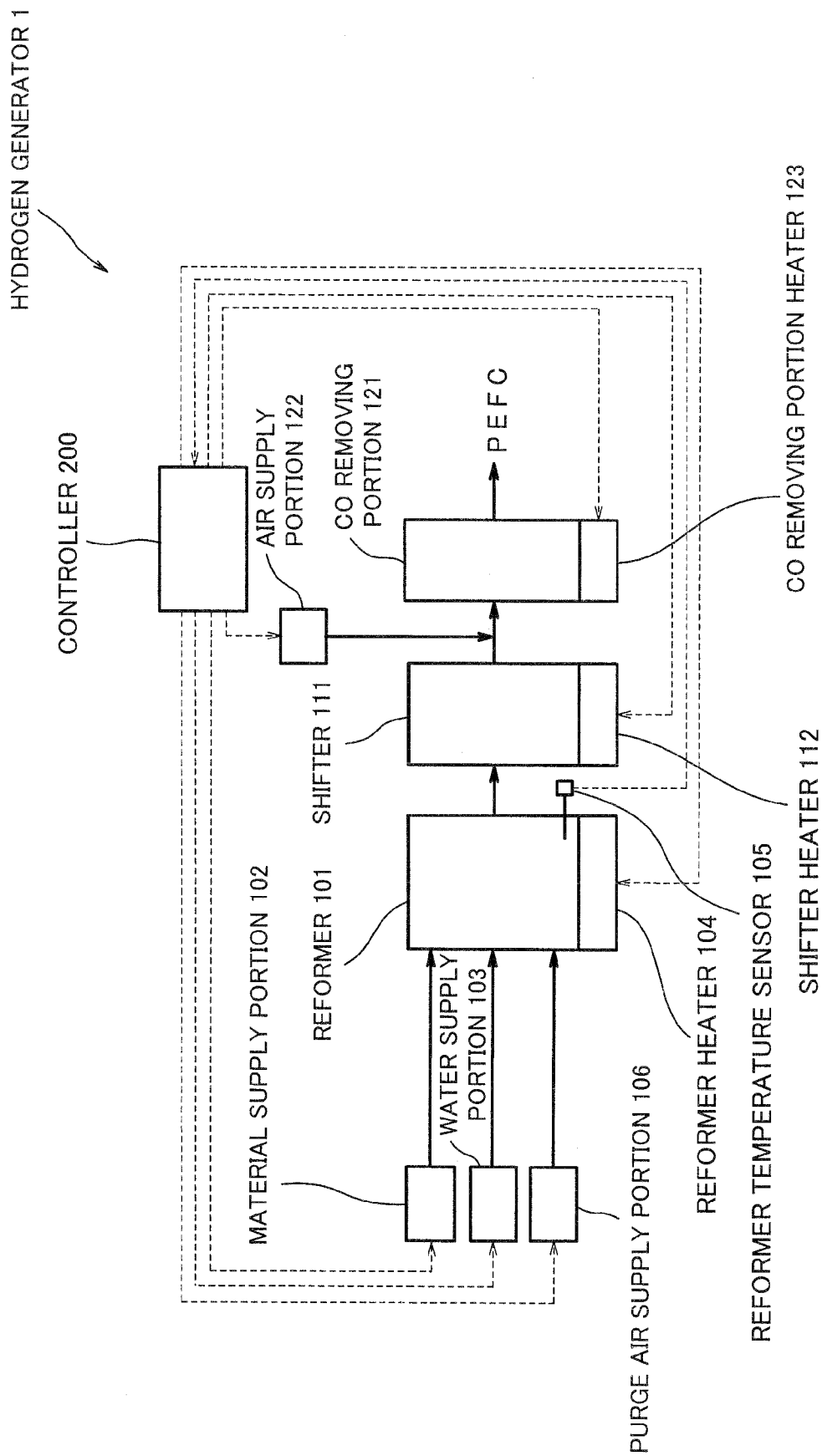
FIG. 3 is a block diagram illustrating the configuration of a hydrogen generator according to embodiment 2 of the present invention.

FIG. 3 is a block diagram illustrating the configuration of a hydrogen generator 1 according to embodiment 2. Embodiment 2 is different from embodiment 1 in that: neither the shifter 111 nor the CO removing portion 121 is equipped with a temperature sensor; and the shifter heater 112 and the CO removing portion heater 123 are caused to operate regardless of the temperature of each of the shifter 111 and the CO removing portion 121. That is, the shifter 111 and the CO removing portion 121 are heated regardless the temperature of the components during the stop operation period without determination based on the temperatures thereof. Like reference characters are used to designate like or corresponding parts throughout FIGS. 1 and 3 and the description of such parts will be omitted.

Figure 4:
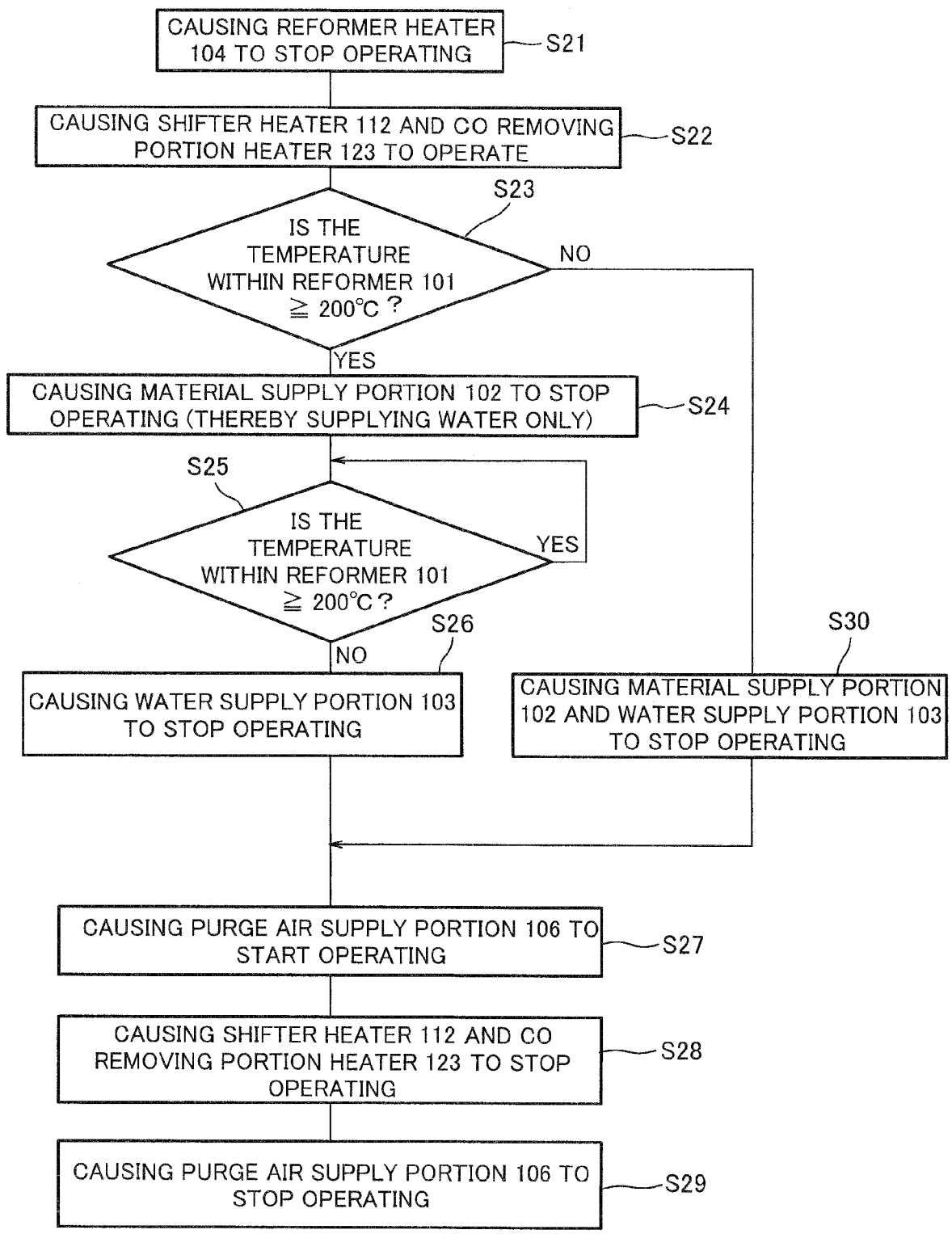
FIG. 4 is a flowchart illustrating an example of a control program executed during the stop operation period of the hydrogen generator shown in FIG. 3.

With reference to FIG. 4, description will be made of an example of a control program executed during the stop operation period of the hydrogen generator 1 according to embodiment 2. The "stop operation", as used herein, is meant to include the operation of stopping hydrogen generation in all cases including not only the case of stop running but also the case of suspension. The "stop operation period" is meant by a time period from a stop instruction is issued until the hydrogen generator stops operating during which a series of operations are performed. The stop operation process of embodiment 2 is different from that of embodiment 1 in that determination step 2 (of determining whether or not the temperature of the shifter 111 or the CO removing portion 121 is not higher than 100° C.) and the steps branched therefrom are omitted.

Initially, in step S21, the controller 200 causes the reformer heater 104 to stop operating.

Subsequently, in step S22, the controller 200 causes the shifter heater 112 and the CO removing portion heater 123 to operate to start heating the shifter 111 and CO removing portion 121. This heating step inhibits steam supplied thereafter from condensing on the shift reaction catalyst and the CO removing catalyst and allows steam to be discharged outside the hydrogen generator 1. The capacity of each of the shifter heater 112 and CO removing portion heater 123 and the heating time and intensity are appropriately established so as to inhibit steam condensation within each of the shifter 111 and CO removing portion 121 and obviate damage to the shifter 111 and CO removing portion 121 due to possible excessive temperature elevation.

Subsequently, in step S23, the controller 200 determines whether or not the temperature detected by the reformer temperature sensor 105 is not lower than 200° C., which is an example of the second predetermined temperature defined by the present invention. This determination is conducted because if air is supplied when the temperature of the reformer 101 is not lower than 200° C., the reforming catalyst is oxidized and deteriorated by air.

If the temperature of the reformer 101 is determined to be not lower than 200° C. in step S23, the controller 200 stops the operation of the material supply portion 102 in step S24. By stopping the operation of the material supply portion 102 while keeping the water supply from the water supply portion 103, the supplied water is evaporated into steam, which is an example of the first purge gas defined by the present invention, within the reformer 101. Steam thus produced passes through the shifter 111 and the CO removing portion 121 and is discharged outside the hydrogen generator 1 while purging residual combustible gas mainly comprising hydrogen from the hydrogen generator 1. In this embodiment, the water supply portion 103 serves as a first purge gas supply portion defined by the present invention.

Subsequently, in step S25, the controller 200 causes the reformer temperature sensor 105 to continue temperature detection until the temperature detected by the reformer temperature sensor 105 becomes lower than 200° C.

Subsequently, in step S26, after the temperature within the reformer 101 has been lowered to lower 200° C., the controller 200 stops the operation of the water supply portion 103, thereby stopping the supply of steam.

In step S27, in turn, the controller 200 causes the purge air supply portion 106 to start operating and continue operating for a predetermined time period. By doing so, the supplied air purges residual steam from the interior of the hydrogen generator 1 and is discharged outside the hydrogen generator 1. This means that this embodiment uses air as the second purge gas defined by the present invention. The purge air supply portion 106 in this embodiment serves as a second purge gas supply portion defined by the present invention.

Subsequently, in step S28, after the interior of the hydrogen generator 1 has been completely purged with air, the controller 200 stops the operation of each of the shifter heater 112 and the CO removing portion heater 123.

Finally, in step S29, the controller 200 causes the purge air supply portion 106 to stop supplying air. In this way, the stop operation of the hydrogen generator 1 is completed.

On the other hand, if the temperature detected by the reformer temperature sensor 105 is determined to be lower than 200° C. in step S23, the reforming catalyst will not be oxidized by purging with air (second purge gas) even if the interior of the hydrogen generator 1 is not purged with steam (first purge gas). For this reason, when the temperature within the reformer 101 is not higher than 200° C., the process proceeds to step S30 in which the operation of each of the material supply portion 102 and the water supply portion 103 is stopped and then to step S27 in which air supply is conducted.

In this embodiment 2, the shifter heater 112 and the CO removing portion heater 123 are caused to operate regardless of whether or not the temperature of the shifter 111 or the CO removing portion 121 is higher than 100° C. Therefore, unlike embodiment 1, this embodiment does not need the provisions of the shifter temperature sensor 113 and CO removing portion temperature sensor 124, which can lead to a simplified device construction and reduced cost.

The time at which the shifter heater 112 and the CO removing portion heater 123 are caused to operate or stop may vary depending on the device construction, the catalysts used, or the like and hence is not limited to that described in this embodiment. The shifter heater 112 and the CO removing portion heater 123 may be caused to operate at any time as long as the temperature of each of the shifter 111 and the CO removing portion 121 can be adjusted to inhibit condensed water from remaining within each of the shifter 111 and the CO removing portion 121.

The hydrogen generator 1 according to this embodiment is not necessarily used in fuel supply to PEFCs and can find use in fuel supply to other types of fuel cells and applications in chemical plants or the like requiring generation of high purity hydrogen.

Notes on Embodiments 1 and 2

The predetermined temperatures may be varied depending on the device construction, catalysts used, or the like and are not limited to the specific temperatures described in embodiments 1 and 2.

The stop operation processes described in embodiments 1 and 2 are illustrative and, hence, there is no limitation thereto. In embodiment 1, for example, it is possible that step S2 (determination of the temperature within each of the shifter 111 and the CO removing portion 121) is performed and then heating is started before step S1 (stop of the operation of the reformer heater 104). Also, it is possible that step S10 (stop of the operation of the purge air supply portion 106) precedes step S9 (stop of the operations of shifter heater 112 and CO removing portion heater 123). In embodiment 2, similarly, step S22 may precede step S21 and step S29 may precede step S28.

The water supply portion 103 configured to supply water for the reforming reaction in each of embodiments 1 and 2 also serves as the first purge gas supply portion defined by the present invention. While the first purge gas defined by the present invention is steam in each of embodiments 1 and 2, it may be feed gas, inert gas, or combustion exhaust gas resulting from the operation of the reformer heater 104, shifter heater 112 or CO removing portion heater 123.

In each of the embodiments 1 and 2, the second purge gas supply portion defined by the present invention corresponds to the purge air supply portion 106, and the second purge gas corresponds to air. However, it is possible that the purge air supply portion 106 is omitted and the source material may be used as the second purge gas. That is, the source material may be supplied from the material supply portion 102 in order to purge and discharge steam.

In each of embodiments 1 and 2, inert gas may be used to purge the interior of the hydrogen generator 1 in the stop operation period. Even in this case, steam remaining within the reformer 101 will not condense to liquid water in each of the shifter 111 and the CO removing portion 121.

The program defined by the present invention is a program which is configured to cause the controller of the hydrogen generator 1 of the present invention to function by means of a computer and hence cooperates with the computer.

The storage medium used in the present invention is a storage medium which contains therein a program configured to cause all or some of the functions of the controller of the hydrogen generator 1 of the present invention to be performed by means of a computer and which allows the program to be read by the computer for the program to cooperate with the computer.

The function of the controller defined by the present invention is meant to include all or part of the functions of the controller.

In one form of use of the program, the program is stored on a computer-readable storage medium and cooperates with a computer.

In another form of use of the program, the program is transmitted through a transmission medium, read by a computer and cooperates with the computer.

Examples of data structures for use in the present invention include database, data format, data table, and different types of data.

Examples of such recording media include ROM and the like. Examples of such transmission media include such a transmission medium as Internet, and light, radio waves, and sonic waves.

The aforementioned computer used in the present invention may include not only such sheer hardware as a CUP but also firmware, OS, and peripheral devices.

The configuration according to the present invention may be implemented either as a software configuration or as a hardware configuration.

Embodiment 3

Figure 5:
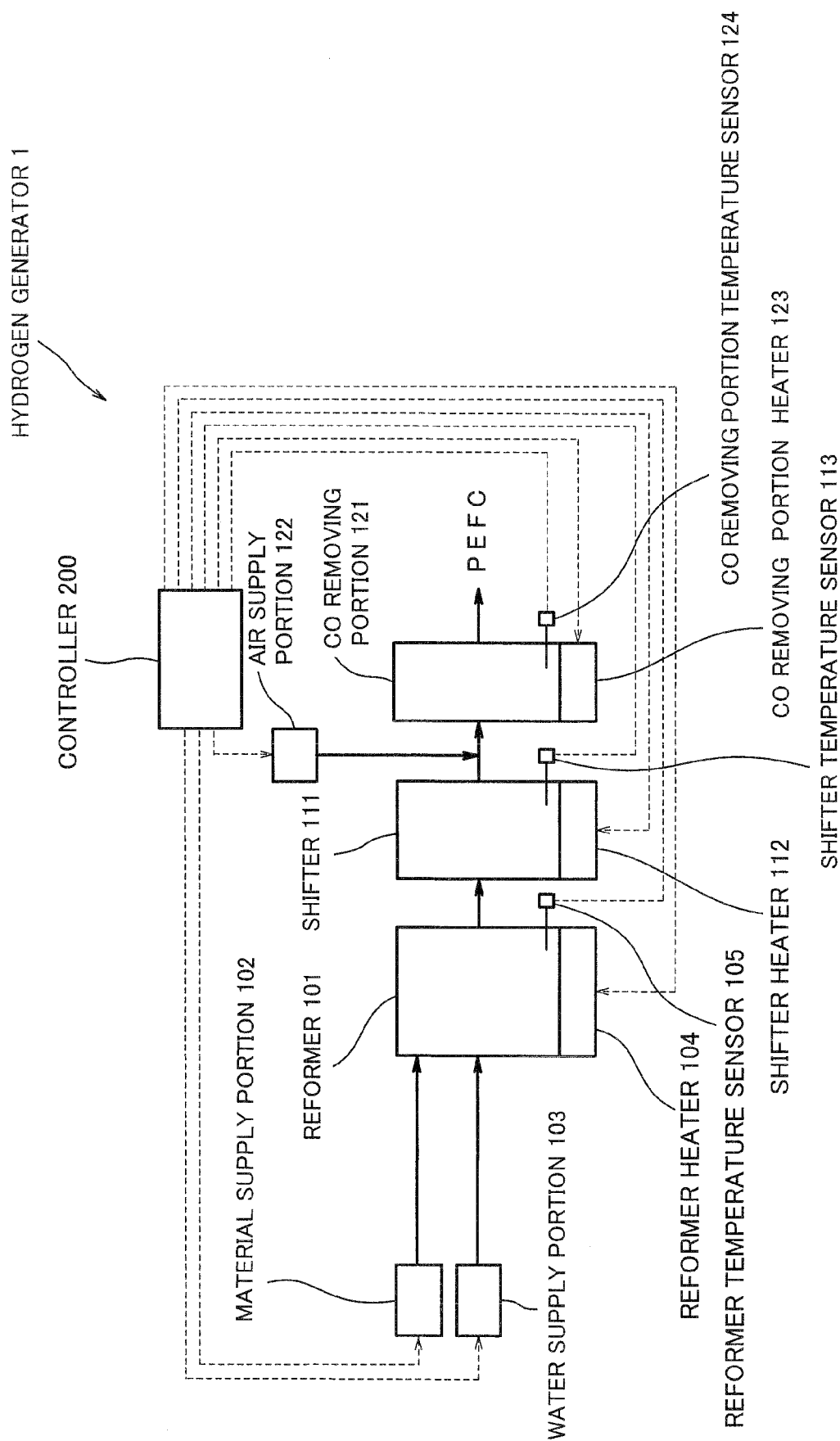
FIG. 5 is a block diagram illustrating the configuration of a hydrogen generator according to embodiment 3 of the present invention.

FIG. 5 is a block diagram illustrating the configuration of a hydrogen generator 1 according to embodiment 3. Embodiment 3 is different from embodiment 1 in that a combustible gas mainly comprising hydrogen is purged with steam, which in turn is purged and discharged with the source material. Therefore, the configuration shown in FIG. 5 does not include the purge air supply portion 106 included in embodiment 1. Like reference characters are used to designate like or corresponding parts throughout FIGS. 1 and 5 and the description of such parts will be omitted.

Figure 6:
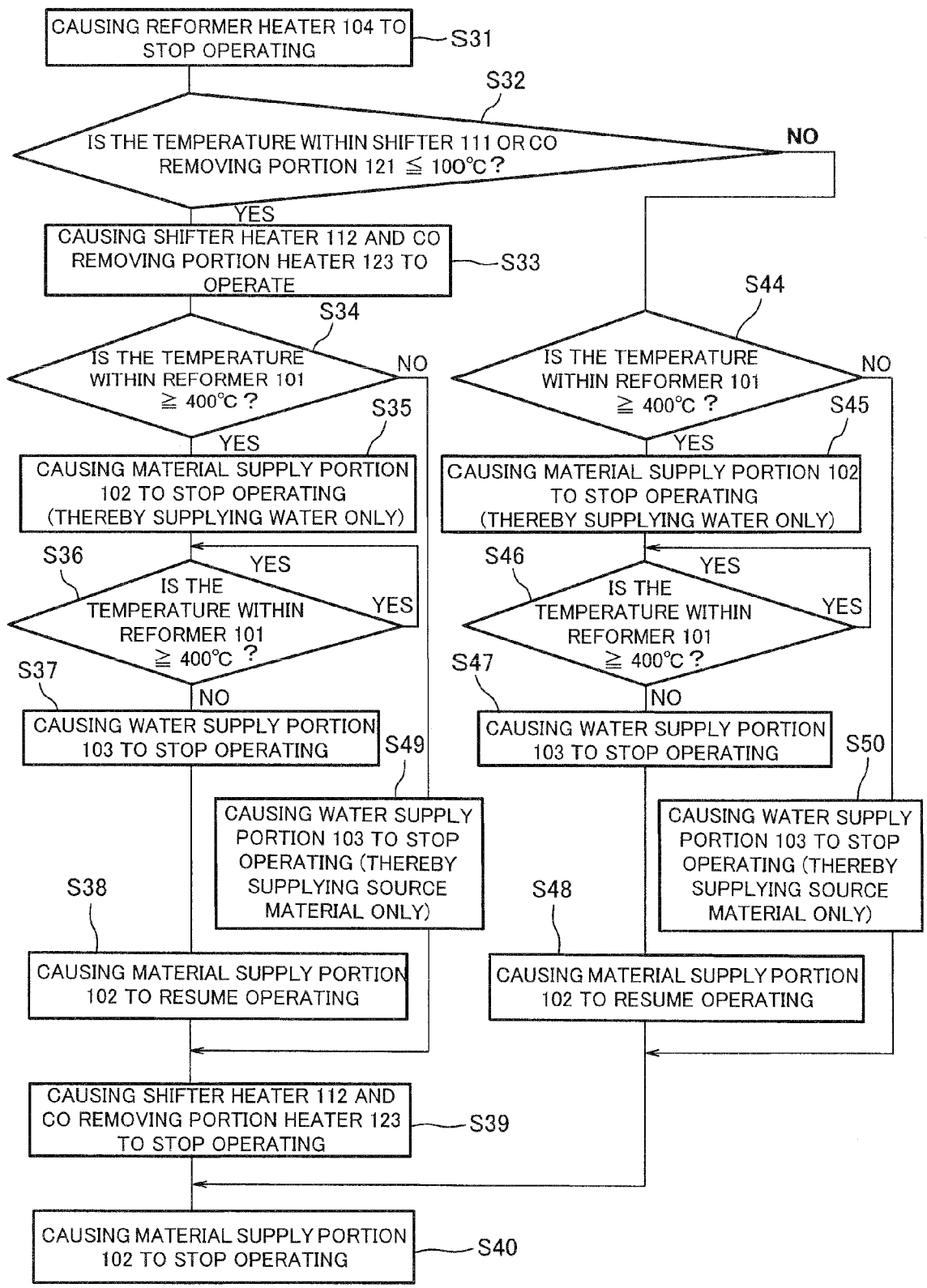
FIG. 6 is a flowchart illustrating an example of a control program executed during the stop operation period of the hydrogen generator shown in FIG. 5.

With reference to the flowchart of FIG. 6, description will be made of an example of a control program executed during the stop operation period of the hydrogen generator 1 according to embodiment 3. The "stop operation", as used herein, is meant to include the operation of stopping hydrogen generation in all cases including not only the case of stop running but also the case of suspension. The "stop operation period" is meant by a time period from the issuance of a stop instruction until the hydrogen generator stops operating during which a series of operations are performed.

Initially, in step S31, the controller 200 causes the reformer heater 104 to stop operating.

Subsequently, in step S32, the controller 200 determines whether or not the temperature detected by the shifter temperature sensor 113 or by the CO removing portion temperature sensor 124 is not higher than 100° C., which is an example of the first predetermined temperature defined by the present invention.

Subsequently, if the temperature detected by the shifter temperature sensor 113 or by the CO removing portion temperature sensor 124 is not higher than 100° C., in step S33, the controller 200 causes the shifter heater 112 and the CO removing portion heater 123 to operate to start heating the shifter 111 and CO removing portion 121. At this time, the controller 200 controls heating so that the temperature detected by each of the shifter temperature sensor 113 and the CO removing portion temperature sensor 124 is kept higher than 100° C. This heating step inhibits steam supplied thereafter from condensing on the shift reaction catalyst and the CO removing catalyst and allows steam to be discharged outside the hydrogen generator 1.

Subsequently, in step S34, the controller 200 determines whether or not the temperature detected by the reformer temperature sensor 105 is not lower than 400° C., which is an example of the second predetermined temperature defined by the present invention. This determination is conducted because if only the source material is supplied with the supply of water stopped when the temperature of the reformer 101 is not lower than 400° C., carbon is deposited on the reforming catalyst and deteriorates the catalytic characteristics thereof.

If the temperature of the reformer 101 is determined to be not lower than 400° C. in step S34, the controller 200 stops the operation of the material supply portion 102 in step S35. By stopping the operation of the material supply portion 102 while keeping the water supply from the water supply portion 103, the supplied water is evaporated into steam, which is an example of the first purge gas defined by the present invention, within the reformer 101. Steam thus produced passes through the shifter 111 and the CO removing portion 121 to purge residual combustible gas mainly comprising hydrogen from the hydrogen generator 1 and is discharged outside the hydrogen generator 1. In this embodiment, the water supply portion 103 serves as the first purge gas supply portion defined by the present invention.

Subsequently, in step S36, the controller 200 causes the reformer temperature sensor 105 to continue temperature detection until the temperature detected by the reformer temperature sensor 105 becomes lower than 400° C.

Subsequently, in step S37, after the temperature within the reformer 101 has decreased to lower than 400° C., the controller 200 stops the operation of the water supply portion 103, thereby stopping the supply of steam.

In step S38, in turn, the controller 200 causes the material supply portion 102 to resume operating and continue operating for a predetermined time period. By doing so, the supplied source material purges residual steam from the interior of the hydrogen generator 1 and is discharged outside the hydrogen generator 1. This means that this embodiment uses the source material as the second purge gas defined by the present invention. And, the material supply portion 102 in this embodiment serves as the second purge gas supply portion defined by the present invention. The aforementioned predetermined time period is a time period sufficient to purge steam from the interior of the hydrogen generator 1. However, if the temperature of each of the shifter 111 and the CO removing portion 121 does not reach 100° C. at the beginning of or before the beginning of step S38, purging with the source material needs to be performed for the predetermined time period from the time 100° C. is reached even though the purging with the source material in step S38 has already started. If purging with steam is conducted in a state where 100° C. is not reached yet, it is possible that steam condenses. However, by conducting purging with the source material for the predetermined time period from the time 100° C. is reached, condensed water can be evaporated and discharged.

Subsequently, in step S39, after the interior of the hydrogen generator 1 has been completely purged with the source material, the controller 200 stops the operation of each of the shifter heater 112 and the CO removing portion heater 123.

Finally, in step S40, the controller 200 causes the material supply portion 102 to stop supplying the source material. In this way, the stop operation of the hydrogen generator 1 is completed.

On the other hand, if both of the temperatures detected by respective of the shifter temperature sensor 113 and the CO removing portion temperature sensor 124 are determined to be higher than 100° C. in step S32, steam condensation does not occur even under a condition in which heating is not conducted. For this reason, the process proceeds to step S44 without causing the shifter heater 112 and CO removing portion heater 123 to operate.

In step S44, in turn, the controller 200 determines whether or not the temperature within the reformer 101 is not lower than 400° C. as in step S34.

Subsequently, in step S45, the operation of the material supply portion 102 is stopped as in step S35.

Subsequently, in step S46, temperature detection is continued until the temperature detected by the reformer temperature sensor 105 becomes lower than 400° C. as in step S36.

Subsequently, in step S47, after the temperature within the reformer 101 has decreased to lower than 400° C., the operation of the water supply portion 103 is stopped as in step S37.

Subsequently, in step S48, the operation of the material supply portion 102 is resumed and continued for the predetermined time period. By doing so, the interior of the hydrogen generator 1 is completely purged with the source material supplied, as in step S38.

Finally, in step S40, the supply of the source material from the material supply portion 102 is stopped.

If the temperature detected by the reformer temperature sensor 105 is determined to be lower than 400° C. in step S34 or step S44, carbon will not be deposited on the reforming catalyst and will not thereby deteriorate the catalytic characteristics thereof due to purging with the source material even if the interior of the hydrogen generator 1 is not purged with steam. For this reason, when the temperature within the reformer 101 is lower than 400° C., the process proceeds from step S34 to step S49 in which the operation of the water supply portion 103 is stopped and then to step S39. From step S44 the process proceeds to step S50 in which the operation of the water supply portion 103 is stopped and then to step S40.

In this way, the temperature within each of the shifter 111 and the CO removing portion 121 can be kept higher than 100° C. by the stop operation in which the shifter heater 112 and the CO removing portion heater 123 are caused to operate. For this reason, steam used for purge does not condense within each of the shifter 111 and the CO removing portion 121. Further, since there is no possibility that steam remains and condenses within each of the shifter 111 and the CO removing portion 121, the catalytic characteristics of the catalysts used therein can be inhibited from deteriorating.

The stop operation described above may be performed not only when the hydrogen generator 1 is in an unsteady operation state like a state just after the start but also when the hydrogen generator 1 is in a steady operation state.

While both of the shifter 111 and the CO removing portion 121 are heated in step S33 if the temperature within the shifter 111 or the CO removing portion 121 is determined to be not higher than 100° C. in step S32, heating may be conducted for only one of these components, the temperature of which is lower than 100° C.

While steps S32, S34 and S44 are each followed by one of different steps which is selected depending on the result of determination, steps S31 to S40 except steps S32, S34 and S44 may be conducted regardless of the temperatures of the components, which means that determinations in steps S32, S34 and S44 may be omitted. If only the supply of the source material is performed with the supply of water stopped when the internal temperature of the reformer 101 is not lower than 400° C., it is possible that deposition of carbon on the reforming catalyst occurs and deteriorates the catalytic characteristics of the reforming catalyst. Therefore, it is preferable to conduct determination of step S36.

While the operations of respective of the shifter heater 112 and the CO removing portion heater 123 are stopped in step S39, they may be stopped in any step without limitation to step S39. For example, control may be performed such that, with the temperatures within respective of the shifter 111 and the CO removing portion 121 being monitored by the shifter temperature sensor 113 and the CO removing portion temperature sensor 124, the shifter heater 112 and the CO removing portion heater 123 are caused to operate when the temperature within one of the shifter 111 and the CO removing portion 121 becomes not higher than 100° C. and stop operating when the temperature becomes higher than 100° C.

In the above described embodiments, when the temperature within the shifter 111 or the CO removing portion 121 is determined to be higher than 100° C. in step S32, steps S44 to S48 are performed without the shifter heater 112 and CO removing portion heater 123 operating. Alternatively, the shifter heater 112 and the CO removing portion heater 123 may be caused to operate when the temperature becomes not higher than 100° C. with the temperature within each of the shifter 111 and the CO removing portion 121 being monitored.

It is possible that step S32 in which the controller 200 determines whether or not the temperature of the shifter 111 or the CO removing portion 121 is not higher than 100° C. and step S33 in which the shifter heater 112 and the CO removing portion heater 123 are caused to operate are performed just before step S38 in which the operation of the material supply portion 102 is resumed. Alternatively, steps S32 and S33 may be performed with the material supply portion 102 operating to purge the interior of the hydrogen generator 1 with the source material. In any case, the shifter heater 112 and the CO removing portion heater 123 may be caused to operate at any time as long as the temperature of each of the shifter 111 and the CO removing portion 121 can be adjusted to inhibit condensed water from remaining within each of the shifter 111 and the CO removing portion 121.

As in embodiment 2, the shifter 111 and the CO removing portion 121 may be heated regardless of the temperatures of the components during the stop operation without determination based on the temperatures thereof. In this case, the shifter 111 and the CO removing portion 121 need not be equipped with respective temperature sensors.

The hydrogen generator 1 according to this embodiment is not necessarily used in fuel supply to PEFCs and can find use in fuel supply to other types of fuel cells and applications in chemical plants or the like requiring generation of high purity hydrogen.

Embodiment 4

The configuration of a hydrogen generator 1 according to embodiment 4 is also illustrated in the block diagram of FIG. 5 used in embodiment 3. This embodiment 4 is different from embodiment 3 in that purging with the source material is performed without the purging with steam.

Figure 7:
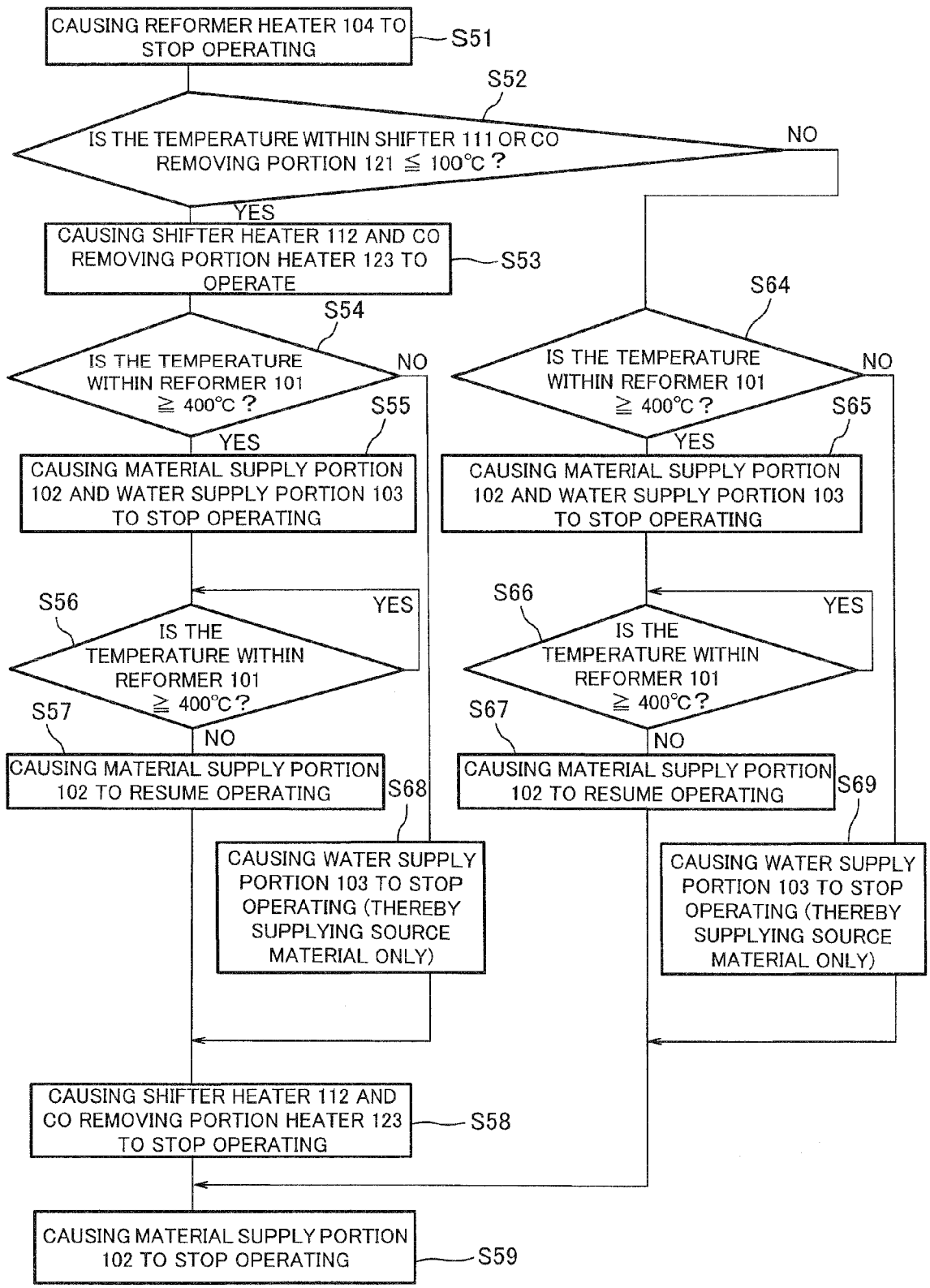
FIG. 7 is a flowchart illustrating an example of a control program executed during the stop operation period of a hydrogen generator according to embodiment 4 of the present invention.

With reference to the flowchart of FIG. 7, description will be made of an example of a control program executed during the stop operation period of the hydrogen generator 1 according to embodiment 4. The "stop operation", as used herein, is meant to include the operation of stopping hydrogen generation in all cases including not only the case of stop running but also the case of suspension. The "stop operation period" is meant by a time period from when a stop instruction is issued until the hydrogen generator stops operating during which a series of operations are performed.

Initially, in step S51, the controller 200 causes the reformer heater 104 to stop operating.

Subsequently, in step S52, the controller 200 determines whether or not the temperature detected by the shifter temperature sensor 113 or by the CO removing portion temperature sensor 124 is not higher than 100° C., which is an example of the first predetermined temperature defined by the present invention.

Subsequently, if the temperature detected by the shifter temperature sensor 113 or by the CO removing portion temperature sensor 124 is not higher than 100° C., in step S53, the controller 200 causes the shifter heater 112 and the CO removing portion heater 123 to operate to start heating the shifter 111 and CO removing portion 121. At this time the controller 200 controls heating so that the temperature detected by each of the shifter temperature sensor 113 and the CO removing portion temperature sensor 124 is kept higher than 100° C. This heating step inhibits steam to be supplied later from condensing on the shift reaction catalyst and the CO removing catalyst and allows steam to be discharged outside the hydrogen generator 1.

Subsequently, in step S54, the controller 200 determines whether or not the temperature detected by the reformer temperature sensor 105 is not lower than 400° C., which is an example of the second predetermined temperature defined by the present invention. This determination is conducted because if only the source material is simply supplied without the water supply under the condition in which the temperature of the reformer 101 is not lower than 400° C., carbon may be deposited on the reforming catalyst and deteriorate the catalytic characteristics thereof.

If the temperature of the reformer 101 is determined to be not lower than 400° C. in step S54, the controller 200 stops the operation of each of the material supply portion 102 and the water supply portion in step S55.

Subsequently, in step S56, the controller 200 causes the reformer temperature sensor 105 to continue temperature detection until the temperature detected by the reformer temperature sensor 105 becomes lower than 400° C.

Subsequently, after the temperature within the reformer 101 has decreased to lower than 400° C., in step S57, the controller 200 causes the material supply portion 102 to resume operating and continue operating for a predetermined time period. By doing so, the source material supplied is discharged outside the hydrogen generator 1 while purging residual combustible gas mainly comprising hydrogen from the interior of the hydrogen generator 1. The aforementioned predetermined time period is a time period sufficient to purge steam from the interior of the hydrogen generator 1. However, if the temperature of each of the shifter 111 and the CO removing portion 121 does not reach 100° C. at the beginning of or before the begging of step S57, purging with the source material needs to be performed for the predetermined time period from the time 100° C. is reached even though the operation of purging with the source material in step S57 has already started. If purging with steam is conducted in a state where 100° C. is not reached yet, it is possible that steam condenses. However, by conducting purging with the source material for the predetermined time period from the time 100° C. is reached, condensed water can be evaporated and discharged.

Subsequently, in step S58, after the interior of the hydrogen generator 1 has been completely purged with the source material, the controller 200 stops the operation of each of the shifter heater 112 and the CO removing portion heater 123.

Finally, in step S59, the controller 200 causes the material supply portion 102 to stop supplying the source material. In this way, the stop operation of the hydrogen generator 1 is completed.

On the other hand, if both of the temperatures detected by respective of the shifter temperature sensor 113 and the CO removing portion temperature sensor 124 are determined to be higher than 100° C. in step S52, steam condensation does not occur even under a condition in which heating is not conducted. For this reason, the process proceeds to step S64 without causing the shifter heater 112 and the CO removing portion heater 123 to operate.

In step S64, in turn, the controller 200 determines whether or not the temperature within the reformer 101 is not lower than 400° C. as in step S54.

Subsequently, in step S65, the operation of each of the material supply portion 102 and the water supply portion 103 is stopped as in step S55.

Subsequently, in step S66, temperature detection is continued until the temperature detected by the reformer temperature sensor 105 becomes lower than 400° C. as in step S56.

Subsequently, after the temperature within the reformer 101 has decreased to lower than 400° C., in step S67, the operation of the material supply portion 102 is resumed and continued for the predetermined time period. By doing so, the interior of the hydrogen generator 1 is completely purged with the source material supplied as in step S57.

Finally, in step S59, the supply of the source material from the material supply portion 102 is stopped.

If the temperature detected by the reformer temperature sensor 105 is determined to be lower than 400° C. in step S54 or step S64, carbon will not be deposited on the reforming catalyst and will not deteriorate the catalytic characteristics thereof due to purging with the source material even if the interior of the hydrogen generator 1 is not purged with steam. For this reason, when the temperature within the reformer 101 is not higher than 400° C., the process proceeds from step S54 to step S68 in which the operation of the water supply portion 103 is stopped and then to step S58. Alternatively, the process proceeds from step S64 to step S69 in which the operation of the water supply portion 103 is stopped and then to step S59.

In this way, the temperature within each of the shifter 111 and the CO removing portion 123 can be kept higher than 100° C. by the stop operation in which the shifter heater 112 and the CO removing portion heater 123 are caused to operate. For this reason, steam used for purge does not condense within each of the shifter 111 and the CO removing portion 121. Since there is no possibility that steam remains and condenses within each of the shifter 111 and the CO removing portion 121, the catalytic characteristics of the catalysts used therein can be inhibited from deteriorating. Further, since the omission of the operation of purging with water shortens the duration of exposure of the catalysts to steam, the catalytic characteristics of the catalysts can be further inhibited from deteriorating.

The stop operation described above may be performed not only when the hydrogen generator 1 is in an unsteady operation state like a state just after the start but also when the hydrogen generator 1 is in a steady operation state.

When the temperature within the shifter 111 or the CO removing portion 121 is determined to be not higher than 100° C. in step S52 and S53, both of the shifter 111 and the CO removing portion 121 are heated, heating may be conducted for only one of these components, the temperature of which is lower than 100° C.

While steps S52, S54 and S64 are each followed by one of different steps which is selected depending on the result of determination, steps S51 to S59 except steps S52, S54 and S64 may be conducted regardless of the temperatures of the components, which means that determinations in steps S52, S54 and S64 may be omitted. Since it is possible that deposition of carbon on the reforming catalyst occurs and thereby deteriorates the catalytic characteristics of the reforming catalyst if the supply of only the source material is performed with the supply of water stopped when the internal temperature of the reformer 101 is not lower than 400° C., it is preferable to conduct determination of step S56.

While the operations of respective of the shifter heater 112 and the CO removing portion heater 123 are stopped in step S58, they may be stopped at any time without limitation to step S58. For example, control may be performed such that with the temperatures within respective of the shifter 111 and the CO removing portion 121 being monitored by the shifter temperature sensor 113 and the CO removing portion temperature sensor 124, the shifter heater 112 and the CO removing portion heater 123 are caused to operate when the temperature within one of the shifter 111 and the CO removing portion 121 becomes not higher than 100° C. and stop operating when the temperature becomes higher than 100° C.

While, if the temperature within the shifter 111 or the CO removing portion 121 is determined to be higher than 100° C. in step S52, steps S64 to S67 are performed without the shifter heater 112 and CO removing portion heater 123 operating, it is possible that with the temperature within each of the shifter 111 and the CO removing portion 121 being monitored, the shifter heater 112 and the CO removing portion heater 123 are caused to operate when the temperature becomes not higher than 100° C.

It is possible that step S52 in which the controller 200 determines whether or not the temperature of each of the shifter 111 or the CO removing portion 121 is not higher than 100° C. and step S53 in which the shifter heater 112 and the CO removing portion heater 123 are caused to operate are performed just before step S57 in which the operation of the material supply portion 102 is resumed. Alternatively, steps S52 and S53 may be performed with the material supply portion 102 operating to purge the interior of the hydrogen generator 1 with the source material. In any case, the shifter heater 112 and the CO removing portion heater 123 may be caused to operate at any time as long as the temperature of each of the shifter 111 and the CO removing portion 121 can be adjusted so to inhibit condensed water from remaining within each of the shifter 111 and the CO removing portion 121.

As in embodiment 2, the controller 200 may be configured to cause the shifter heater 112 and the CO removing portion heater 123 to operate for a predetermined time period. In this case, the shifter 111 and the CO removing portion 121 need not be equipped with respective temperature sensors.

The hydrogen generator 1 according to this embodiment is not necessarily be used in fuel supply to PEFCs and can find use in fuel supply to other types of fuel cells and applications in chemical plants or the like requiring generation of high purity hydrogen.

Embodiment 5

This embodiment is a fuel cell system 2 including the hydrogen generator 1 according to any one of embodiments 1 to 4, and a fuel cell. The fuel cell system 2 uses the hydrogen-rich gas generated by the hydrogen generator 1 as a fuel for the fuel cell 125.

Figure 9:
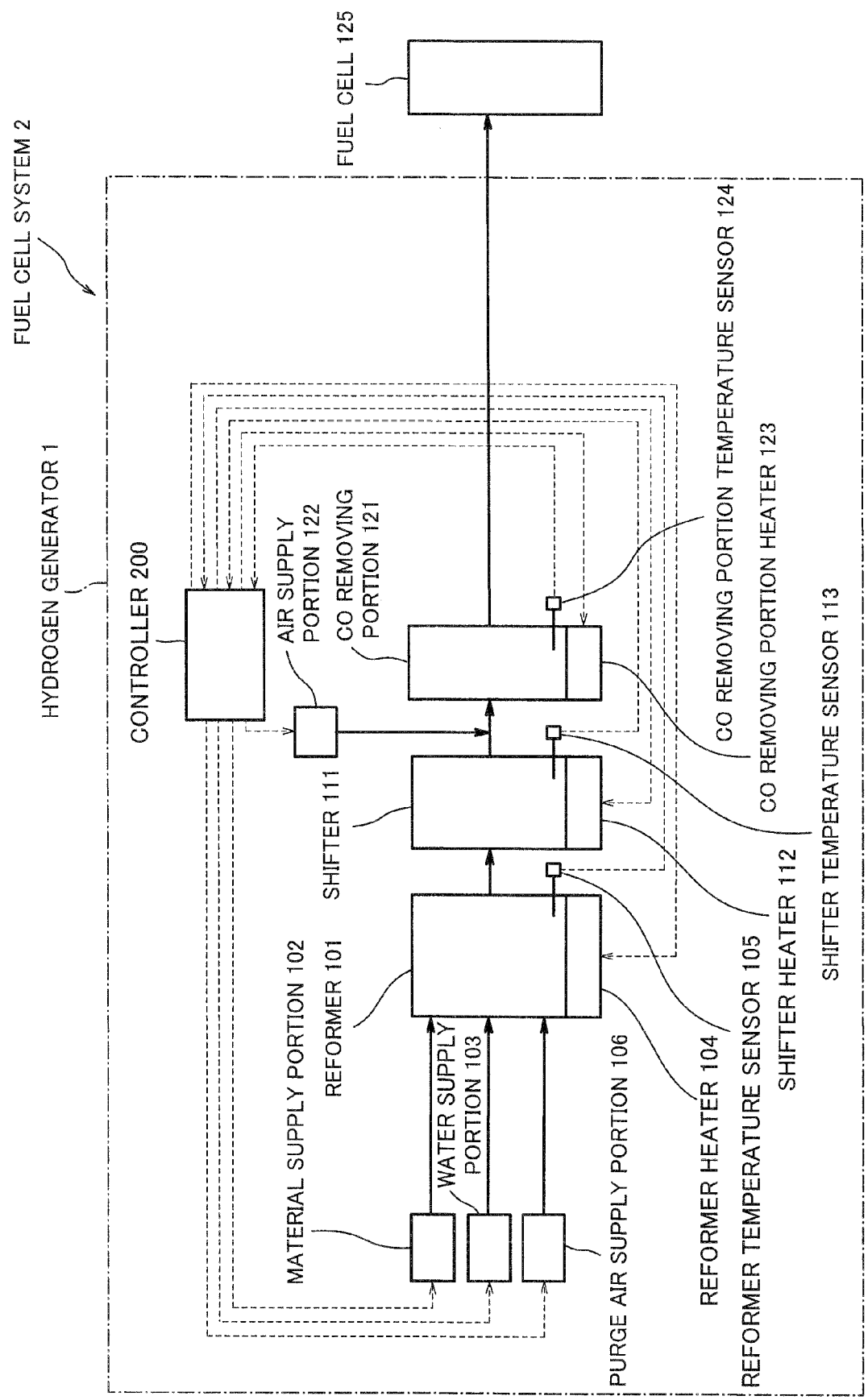
FIG. 9 is a block diagram schematically illustrating an example of the configuration of a fuel cell system according to embodiment 5 of the present invention.

FIG. 9 is a block diagram schematically illustrating an example of the configuration of the fuel cell system 2 according to this embodiment. The fuel cell system 2 shown in FIG. 9 includes the fuel cell 125 in addition to the hydrogen generator 1 of embodiment 1. For this reason, like reference characters are used to designate like or corresponding parts throughout FIGS. 1 and 9 and description of such parts will be omitted.

The fuel cell 125 generates electric power by using a hydrogen-rich gas as a fuel. The fuel cell 125 has a fuel supply port connected to the CO removing portion 121. The hydrogen-rich gas generated by the hydrogen generator 1 is supplied to the fuel cell 125. This embodiment uses, for example, a polymer electrolyte fuel cell (PEFC) as the fuel cell 125.

The fuel cell system 2 having such a configuration is capable of inhibiting water condensation within the carbon monoxide reducing portion during the stop operation period. Accordingly, the catalysts used in the carbon monoxide reducing portion can be inhibited from deteriorating, which leads to a prolonged lifetime of the fuel cell system.

It is to be noted that this embodiment may use a hydrogen generator 1 according to any one of embodiments 2 to 4 instead of the hydrogen generator 1 according to embodiment 1.

While only certain presently preferred embodiments of the present invention have been described in detail, as will be apparent for those skilled in the art, certain changes and modifications may be made in embodiments without departing from the spirit and scope of the present invention as defined by the following claims.

What is claimed is:

1. A method of operating a hydrogen generator including: a reformer having a reforming catalyst configured to cause a source material and water to react with each other to generate a hydrogen-rich reformed gas; a reformer heater configured to heat said reformer; a carbon monoxide reducing portion having a carbon monoxide reducing catalyst configured to reduce carbon monoxide contained in the reformed gas; a carbon monoxide reduction heater configured to heat at least one of said carbon monoxide reducing portion, the carbon monoxide reducing catalyst and the reformed gas passing through said carbon monoxide reducing portion; and a reformer temperature sensor configured to detect a temperature of said reformer, said method comprising:

in a stop operation period, stopping supply of the source material and water to the reformer;

in a state in which the supply of the source material and the water to the reformer is stopped, heating said carbon monoxide reducing portion by operating said carbon monoxide reduction heater such that a temperature of said carbon monoxide reducing portion is kept higher than a first predetermined temperature which fails to allow steam present within said carbon monoxide reducing portion to condense;

then supplying the source material to purge an interior of the hydrogen generator when the temperature detected by said reformer temperature sensor becomes a temperature which fails to allow carbon to be deposited on the reforming catalyst; and then stopping the supply of the source material and the operation of said carbon monoxide reduction heater.

2. The method according to claim 1, wherein:

said carbon monoxide reducing portion comprises at least one of a shifter and a carbon monoxide removing portion, said carbon monoxide reduction heater comprises at least one of a shifter heater and a carbon monoxide removing portion heater, said shifter has a carbon monoxide reducing catalyst comprising a shift reaction catalyst, and said carbon monoxide removing portion has a carbon monoxide reducing catalyst comprising at least one of a selective oxidization catalyst and a methanation catalyst.

3. The method according to claim 1, wherein said hydrogen generator further includes:

a carbon monoxide reducing portion temperature sensor configured to detect a temperature of said carbon monoxide reducing portion, said method further comprising:

in the stop operation period, operating said carbon monoxide reduction heater for at least a time period during which the temperature of said carbon monoxide reducing portion is not higher than the first predetermined temperature.

4. The method according to claim 1, further comprising heating said carbon monoxide reducing portion by operating said carbon monoxide reduction heater in response to a stop instruction to initiate a stop operation in the stop operation period.

5. The method according to claim 1, wherein said hydrogen generator further includes:

a first purge gas supply portion configured to supply a first purge gas; and a second purge gas supply portion configured to supply a second purge gas;

said method further comprising, in the stop operation period, operating said second purge gas supply portion until said hydrogen generator becomes fully filled with the second purge gas when the temperature detected by said reformer temperature sensor is lower than a second predetermined temperature; and operating said first purge gas supply portion until the temperature detected by said reformer temperature sensor becomes lower than the second predetermined temperature, when the temperature detected by said reformer temperature sensor is not lower than the second predetermined temperature, and then operating said second purge gas supply portion until said hydrogen generator becomes fully filled with the second purge gas.

6. The method according to claim 5, wherein:

the first purge gas is steam, the second purge gas is air, and the second predetermined temperature is a temperature which fails to allow the reforming catalyst to be oxidized.

7. The method according to claim 5, wherein:

the first purge gas is steam, the second purge gas is the source material, and the second predetermined temperature is a temperature which fails to allow carbon to be deposited on the reforming catalyst.

8. The method according to claim 5, wherein the first purge gas is one of a combustion exhaust gas and an inert gas.

9. A method of operating a fuel cell system including a hydrogen generator including: a reformer having a reforming catalyst configured to cause a source material and water to react with each other to generate a hydrogen-rich reformed gas; a reformer heater configured to heat said reformer; a carbon monoxide reducing portion having a carbon monoxide reducing catalyst configured to reduce carbon monoxide contained in the reformed gas; a carbon monoxide reduction heater configured to heat at least one of said carbon monoxide reducing portion, the carbon monoxide reducing catalyst and the reformed gas passing through said carbon monoxide reducing portion; and a reformer temperature sensor configured to detect a temperature of said reformer; and a fuel cell configured to generate electric power using hydrogen generated by said hydrogen generator, said method comprising:

in a stop operation period,
stopping supply of the source material and water to the reformer;
in a state in which the supply of the source material and the water to the reformer is stopped, heating said carbon monoxide reducing portion by operating said carbon monoxide reduction heater such that a temperature of said carbon monoxide reducing portion is kept higher than a first predetermined temperature which fails to allow steam present within said carbon monoxide reducing portion to condense;
then supplying the source material to purge an interior of the hydrogen generator when the temperature detected by said reformer temperature sensor becomes a temperature which fails to allow carbon to be deposited on the reforming catalyst; and
then stopping the supply of the source material and the operation of said carbon monoxide reduction heater.

* * * * *